Dec. 5, 1967  R. W. TAYLOR  3,356,410
COLLAPSIBLE TRAILERS
Filed Oct. 15, 1965  2 Sheets-Sheet 1
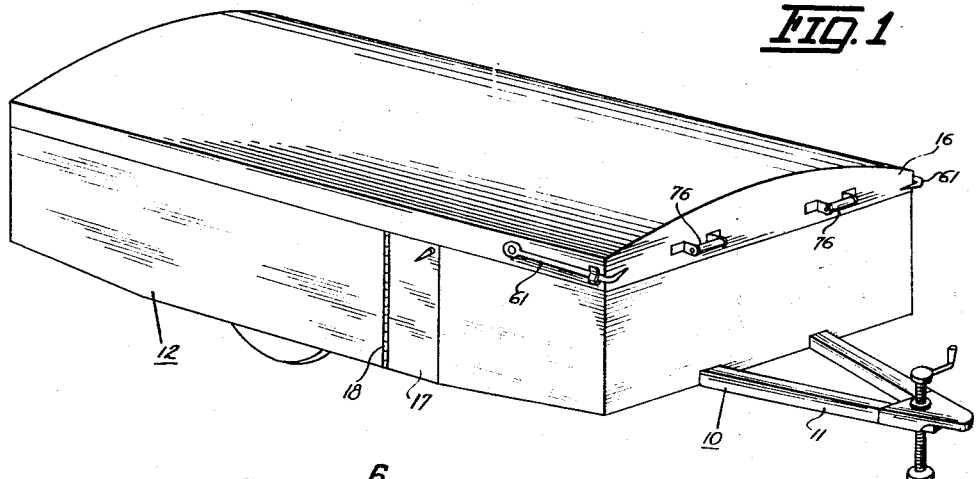
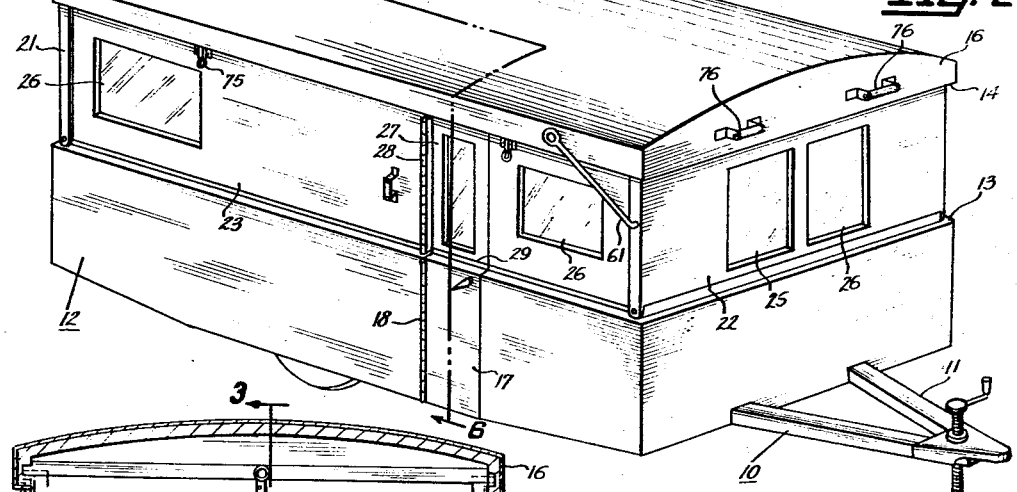
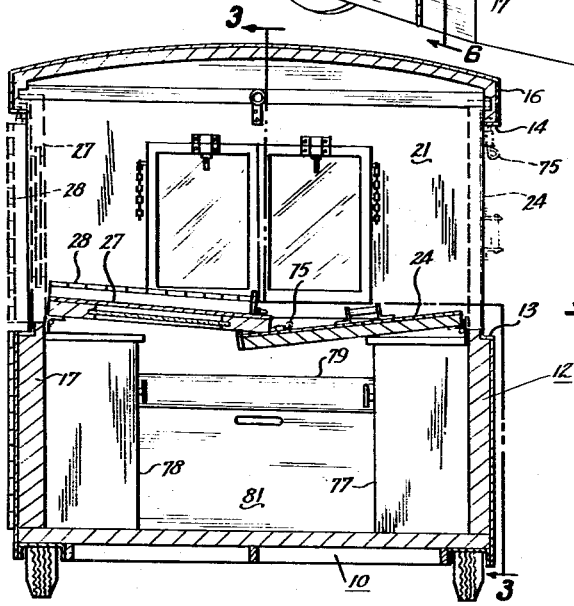
INVENTOR.
RALPH WENDELL TAYLOR
BY Corey & Corey
ATTORNEYS.

Dec. 5, 1967        R. W. TAYLOR        3,356,410
COLLAPSIBLE TRAILERS
Filed Oct. 15, 1965        2 Sheets-Sheet 2
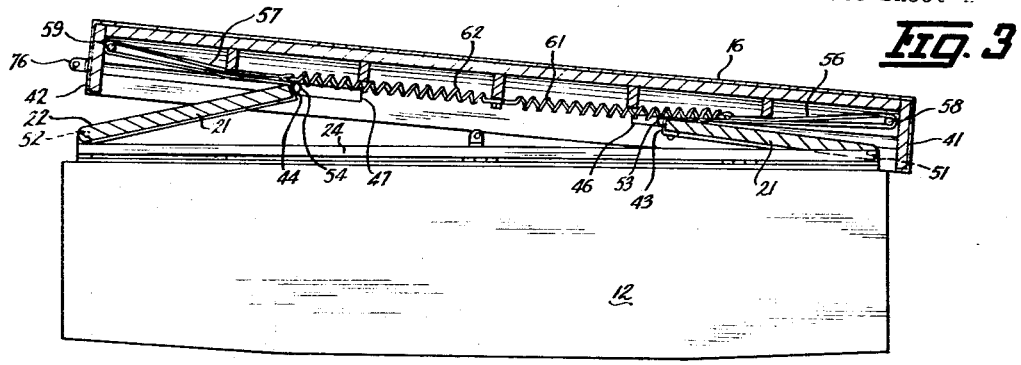
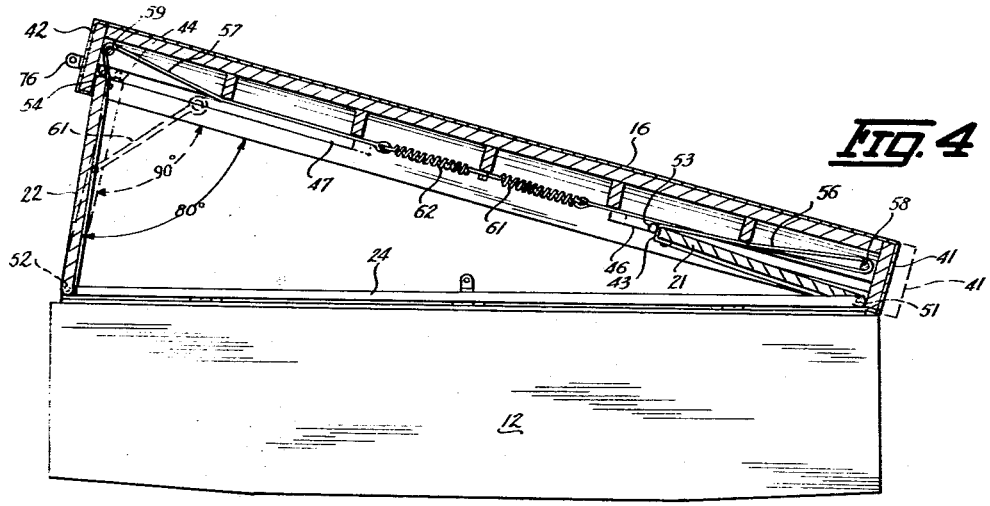
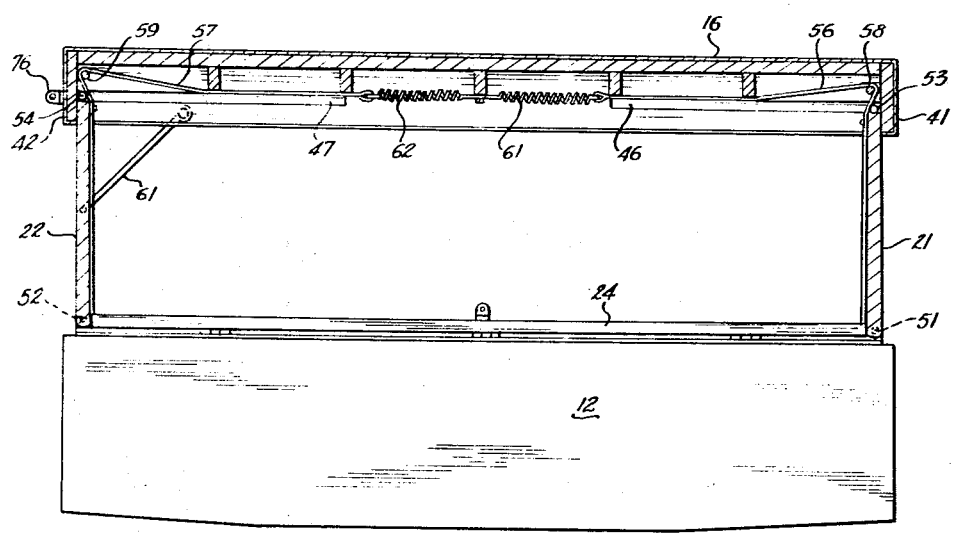
INVENTOR.
RALPH WENDELL TAYLOR
BY Corey & Corey
ATTORNEYS.

United States Patent Office 3,356,410
Patented Dec. 5, 1967

3,356,410
COLLAPSIBLE TRAILERS
Ralph Wendell Taylor, 1121 Seymour Ave.,
Iowa City, Iowa 52240
Filed Oct. 15, 1965, Ser. No. 496,638
4 Claims. (Cl. 296—27)

ABSTRACT OF THE DISCLOSURE

A collapsible trailer in which raising of one end of the cover permits a spring-biased end panel, pivoted on the end of the box, to spring up to support that end of the cover. Positioning and locking means are provided to hold the panel in depending position from the cover. When the opposite end of the cover is raised, the cover pivots about on the first end panel as a fulcrum, and a second end panel springs up to support the other end of the cover. The side walls may then be placed. Raising and lowering may be accomplished by one person.

---

This invention relates to travel trailers and has particular relation to a folding, collapsible type of trailer.

In pulling a trailer, it is desirable that the trailer present a low outline and that its center of gravity be low so that it offers a minimum of wind resistance and is not readily upset. However, such trailers have presented a problem in erecting the roof and the cover and the sides, and either a telescoping structure is employed with very complicated raising and lowering means, or a light canvas structure is employed which of course is very unpleasant in wet weather. The telescoping type has a disadvantage in that windows and the like on the upper portion are down close to the ground in transporting so that they are readily broken by rocks and gravel, and of course the interior becomes very dusty.

It is, therefore, an object of my invention to provide a collapsible trailer employing solid sides and end portions for the upper structure and a tight fitting cover or cap so constructed that it may readily be raised and lowered by hand without the necessity of elaborate mechanical winches and the like.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of a trailer constructed according to one embodiment of my invention as it appears in the traveling or towing condition.

FIGURE 2 is a view in perspective showing the trailer as it appears in the erected condition.

FIGURE 3 is a view in section of the body and top of the trailer with the top cut away to show the assist means for aiding in erecting the trailer as well as the structure by which the ends of the trailer are closed off.

FIGURE 4 is a view in section illustrating how the cover or top is raised at one end and is moved back slightly to permit the raised end to be locked in place in a position at right angles to the cover. The next step in raising the cover is illustrated in dotted lines.

FIGURE 5 is a view in section showing the cover in the raised position, with the upper end walls locked in place, and FIGURE 6 is a view in section taken along the lines 6—6 of FIGURE 2 and illustrating in full lines the position of the sides of the trailer in the retracted position and, in dotted lines, the sides as they appear in the erected position. Also shown is the interior arrangement of the trailer.

Referring now to the drawings:

A trailer constructed according to one embodiment of my invention employs a conventional frame, indicated generally at 10, with the A frame illustrated at 11. This frame is substantially of usual construction with the wheels received well up in the frame.

A box-like lower portion or body 12 is provided and mounted on the frame 10 and this box is so constructed as to afford a sort of upper ledge 13 on all four sides to receive the lower edges 14 of the cover or cap 16.

The cover or cap 16 is preferably recessed, as best illustrated in FIGURES 3, 4, 5 and 6, to receive the side and end walls and also a pivotal connection with the end walls to assist in raising the upper portion and cap as hereinafter described.

A half door 17 is provided, preferably at the right-hand side of the box, and this has hinges illustrated at 18 substantially flush with the surface of the box.

The front end wall 21, the rear end wall 22, the side walls 23 and 24 which constitute the walls of the upper portion of the trailer in the extended position, are panels pivotally attached to the upper edges of the box-like member so that the side walls may be folded in as illustrated in FIGURE 6, and these side walls are provided with windows as desired and as illustrated at 26.

The upper portion 27 of the door constitutes a sort of Dutch-type door in that it too can fold in with the wall 23, and the hinge at 28 is aligned with the hinge 18 while in the raised position so that the door as a whole can be swung out and in as desired as a conventional door. The upper portion of the door may be hinged, as illustrated at the point 29, to the lower portion 17 or it may move independently of the lower portion.

Reference is had to FIGURES 3, 4 and 5 to illustrate the means for raising the cover and the construction thereof.

The cover 16 is preferably a shallow inverted box with end walls 41 and 42, and the trailer end walls 21 and 22 fit within this cover. The end walls 21 and 22 are preferably provided with roller pins or pinned connections at both ends of the upper edges of the end walls 43 and 44 which are received in slots 46 and 47 in the side walls of the cover, and similar slots are provided in the other side wall and cover so that the cover is at all times physically connected with the end walls and thus the body of the trailer. The end walls 21 and 22 are pivotally connected at 51 and 52 to the end walls of the trailer. The upper edges of these end walls, as at 43 and 44, are connected to cords 56 and 57 and these cords are trained over pulleys 58 and 59 in the end cap of the cover and are connected to tension springs 61 and 62. In the down position of the end walls, as shown in FIGURE 3, the springs 61 and 62 are in tension and thus help to lift the end walls into place.

In raising the cover, one end is lifted by hand as shown in FIGURE 3 until the upper end wall or folding end wall 22 is in the upright position. Note that the cover itself has been moved to the right or shifted so that the end wall 22 will be at right angles to the cover, even though the cover is tilted, then the locking bar or locking means 61, which has been in folded position as shown in FIGURE 1, is brought down and engaged in a suitable socket in the end wall 22 so that this end of the cover is now rigidly connected to the end wall. The other end of the cover is then raised, with the lower edge of end wall 22 now acting as a fulcrum, as indicated by the dotted line intermediate position of FIGURE 4 and the end wall 21 springs into place, and the cover is then vertically aligned with the box 12 (see FIGURE 5).

The side walls 23 and 24 are still in the down position shown in FIGURE 6, but the operator can raise side wall 23 to a vertical position and thus get inside to raise the opposite wall 24 into the vertical position. Suitable locking means 75 may be employed to lock the wall in position and handles at 76 may be employed as assist handles in raising the top or cover.

The procedure is of course reversed in lowering the cover or top for traveling. The connection of top and side walls and base is sufficiently rigid that the trailer may be moved about or transported with the cover and side walls raised, and its rigid position would be maintained. But of course some of the advantages of decreased wind resistance and lower center of gravity would be nullified.

The box of course may be fitted out with the usual cabinets as at 77 and 78, beds 79, storage compartment 81, and sinks, stoves and the like as constitute the usual trailer equipment.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a collapsible trailer including a box-like body and a shallow inverted box-like cover, front and rear end panels pivotally engaged to the upper edges of the respective ends of the body, spring means to bias the end panels into raised, extended position when the cover is raised, which spring means include springs secured with a dead end to the inside of the cover, and cords secured to the live ends of the springs and trained over pulleys at the ends of the cover and back to the upper edges of the end panels, the cover being longitudinally shiftable on the box while in the tilted position, means for engaging the end panels in rigid position at right angles with respect to the cover after they are extended, whereby the operator may raise one end of the cover and the corresponding end panel will swing up into place and may be locked and used as a fulcrum as the other end of the cover is raised.

2. A trailer as set forth in claim 1 in which rollers are provided on the upper ends of the end panels and the rollers are received in grooves in the inside of the side walls of the cover.

3. A trailer as set forth in claim 1 having hinged side panels as well as end panels, and the side panels have their hinges on the inside of the box and panels, and the upper edges of the panels when extended are located inside the cover to provide self-locking upper walls.

4. A trailer as set forth in claim 1 in which a half door is provided in the box and a half door in a side wall, the two half doors being in alignment to swing open and closed together.

References Cited

UNITED STATES PATENTS

| | | | |
|---|---|---|---|
| 2,834,632 | 5/1958 | Mattox | 296—27 |
| 3,288,521 | 11/1966 | Patnode | 296—23 |
| 2,640,721 | 6/1953 | Kors | 296—23.2 |
| 1,972,415 | 9/1934 | Anderson | 296—26 |
| 3,273,934 | 9/1966 | Hagenson | 296—26 |
| 2,168,069 | 8/1939 | Miller | 296—23 |

LEO FRIAGLIA, *Primary Examiner.*

PHILIP GOODMAN, BENJAMIN HERSH, *Examiners.*